Figure 1:
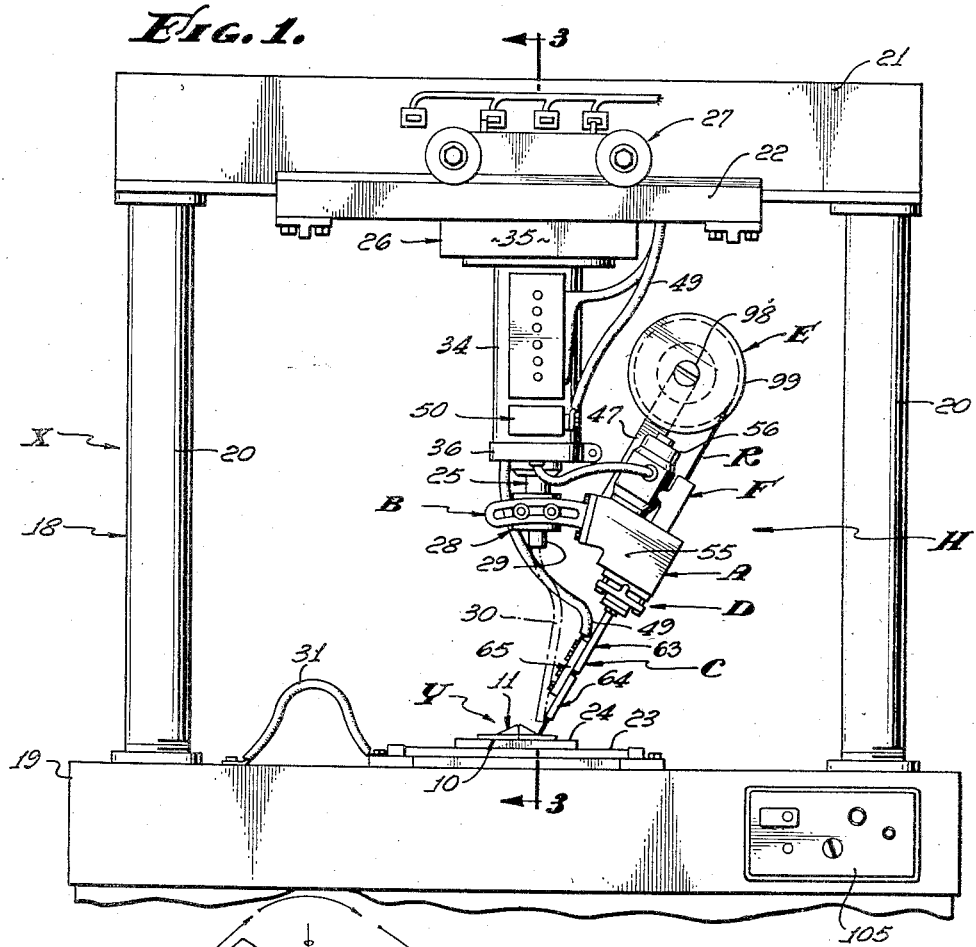

June 17, 1958 — E. L. LAUNDER ET AL — 2,839,666
WELDING HEAD
Filed Dec. 31, 1956 — 4 Sheets-Sheet 1

ERNIE L. LAUNDER
MAX FREDERICK, JR.
ALLEN W. LOUDON
INVENTORS.

BY W. H. Maxwell
AGENT.

June 17, 1958
E. L. LAUNDER ET AL
2,839,666
WELDING HEAD
Filed Dec. 31, 1956
4 Sheets-Sheet 2
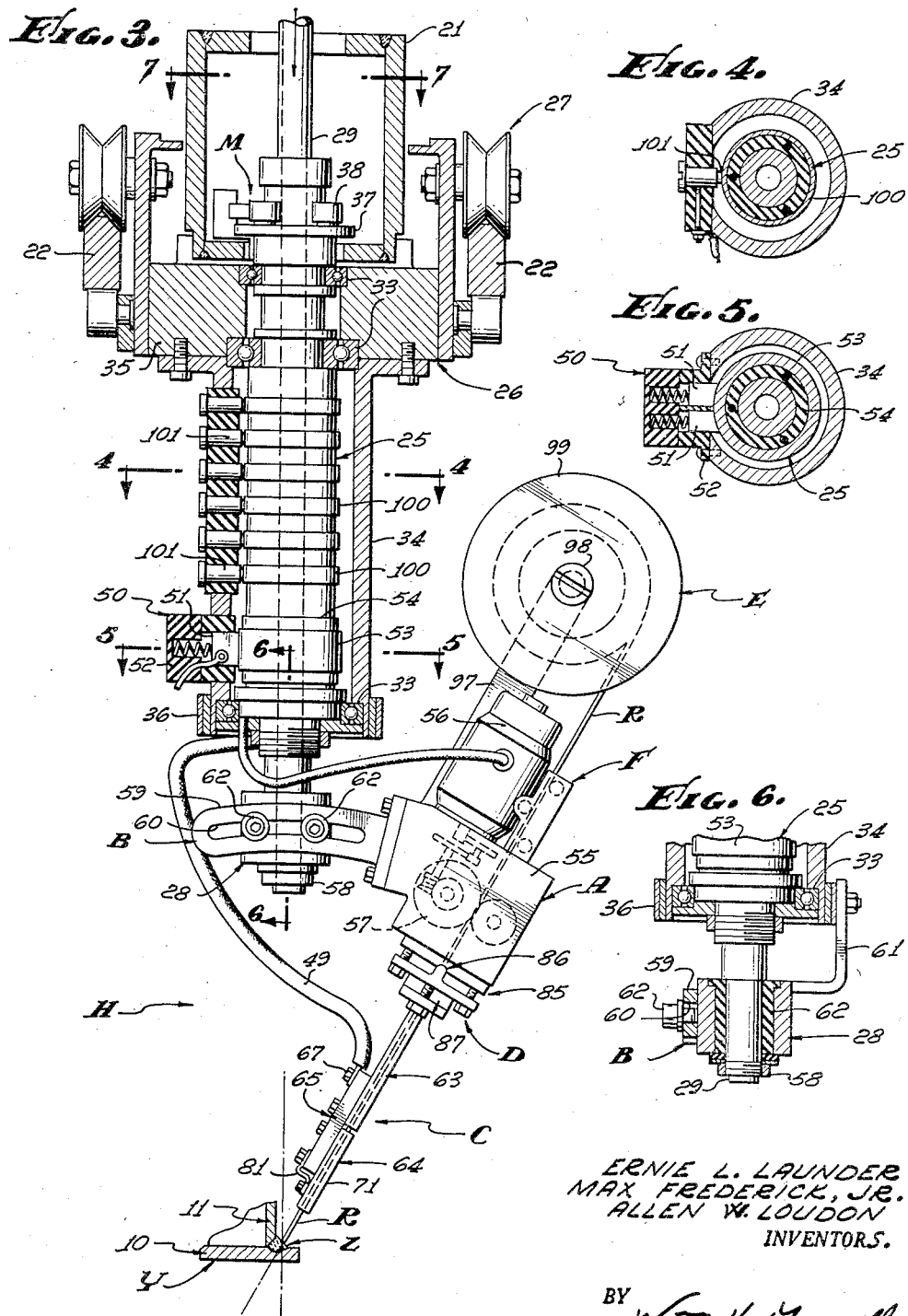
ERNIE L. LAUNDER
MAX FREDERICK, JR.
ALLEN W. LOUDON
INVENTORS.
BY
AGENT.

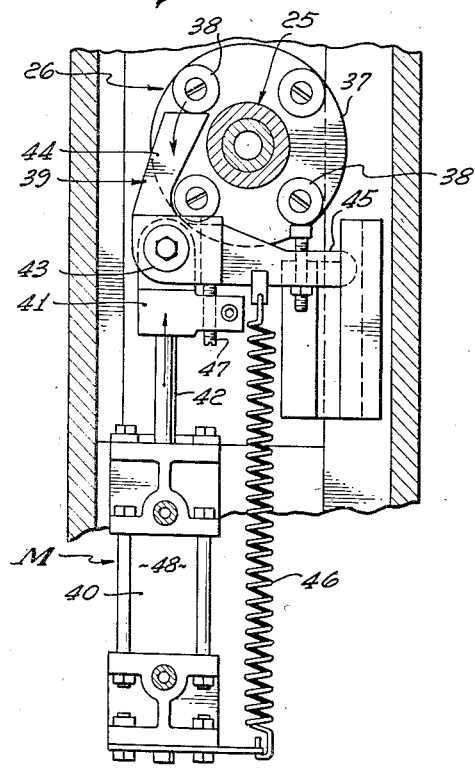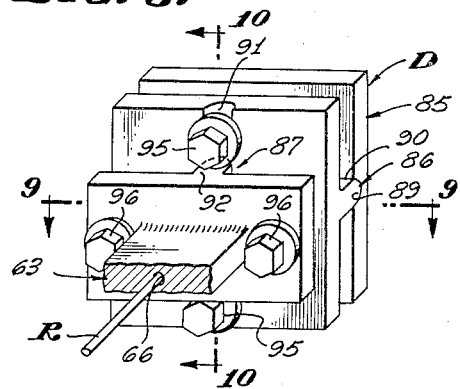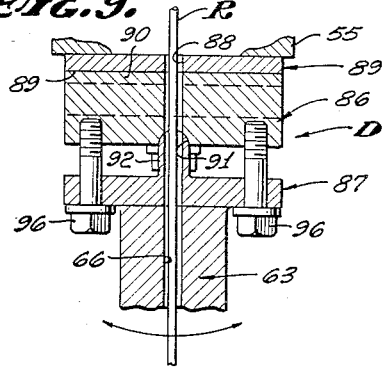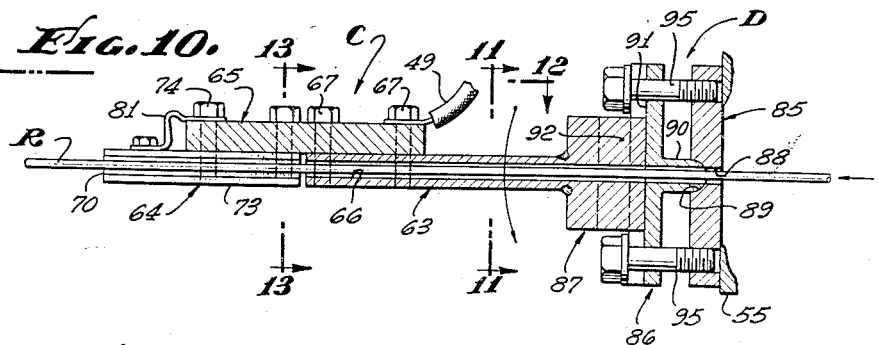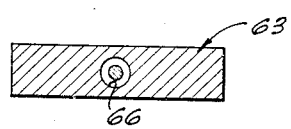
ERNIE L. LAUNDER
MAX FREDERICK, JR.
ALLEN W. LOUDON
INVENTORS.
BY
AGENT.

June 17, 1958 E. L. LAUNDER ET AL 2,839,666
WELDING HEAD
Filed Dec. 31, 1956 4 Sheets-Sheet 4

ERNIE L. LAUNDER
MAX FREDERICK, JR.
ALLEN W. LOUDON
INVENTORS.

BY
W. H. Morrell
AGENT.

United States Patent Office 2,839,666
Patented June 17, 1958

2,839,666

WELDING HEAD

Ernie L. Launder, Montebello, Allen W. Loudon, Downey, and Max Frederick, Jr., Whittier, Calif., assignors to H. & L. Tooth Company, Montebello, Calif., a corporation of California Application December 31, 1956, Serial No. 631,573

15 Claims. (Cl. 219—130)

This invention has to do with a welding head for a work fabricating machine, it being a general object of the invention to provide a welding head which is operable to handle an electric arc and welding material in connection with work or parts to be assembled, so that the parts are accurately, securely and dependably welded at various points, for instance, continuously about a particular portion, or as circumstances may require.

This is a continuation in part of application Serial No. 338,292 filed February 24, 1953, entitled Work Fabricating Machine, now Patent No. 2,835,786.

Work fabricating machines of the type under consideration are employed to assemble and weld parts together and may be automatically or semi-automatically operated. These machines commonly employ electric arc welding involving a welding head that travels relative to the work being assembled and which feeds welding rod to the work in the presence of a rather high current of electricity, to the end that welding material is continuously applied to the work. The seams of welding applied by these machines is sometimes straight, but may be rectilinear and even curved. Heretofore, when a light or thin section of material is to be welded to a heavy section of material, back-up bars or "chill rings" have been used. Said "chill rings" may be of copper and control the heat to the end that the light or thin section does not blow through during the welding operation. In some cases it is not practical to use back-up bars or chill rings in which case it becomes extremely difficult to make a satisfactory weld. We have found that the tip, or active end of the welding rod must be accurately applied to the exact point of welding, and that the welding rod must be related to the point of welding at an exact angle, otherwise an inferior weld is produced. For example, too much or too little rod material may be applied by misalignment of the rod, or by the improper angular relationship. Also, misalignment of the rod may result in burning through the parts being assembled, etc. Therefore, accurate positioning and/or placement of the welding rod by the welding head is much to be desired and means the difference between an operative machine and one that is inoperative.

An object of the invention is to provide a welding head for a work fabricating machine that is adapted to accurately and dependably align the welding rod with the point of weld on the parts being assembled without restorting to back-up bars or "chill rings."

Another object of the invention is to provide a welding head for a machine of the character referred to that adjustably carries and applies the welding rod to the point of weld on the parts being assembled.

Another object of this invention is to provide a welding head for a machine of the general character referred to, wherein a line of welding is applicable to the work parts to establish a continuous loop or ring of welding, the form of which corresponds to the work parts and may, for example, be rectangular in plan configuration when the work parts require that form of weld.

Another object of this invention is to provide a welding head for a machine of the general character referred to, characterized by a simple combination, arrangement and relationship of parts which make for simple, inexpensive manufacture as well as practical, dependable and rapid operation of said machine.

It is still another object of this invention to provide a head for a welding machine whereby fillet welding is applied to the point of joinder between a horizontal and a vertically disposed part. That is, the structure provided is adapted to weld angularly related parts.

It is still another object of this invention to provide a welding head of the character referred to wherein the tip construction is adapted to pass a maximum flow of current into the welding rod that is handled without excessive heating of said rod.

Figure 2:
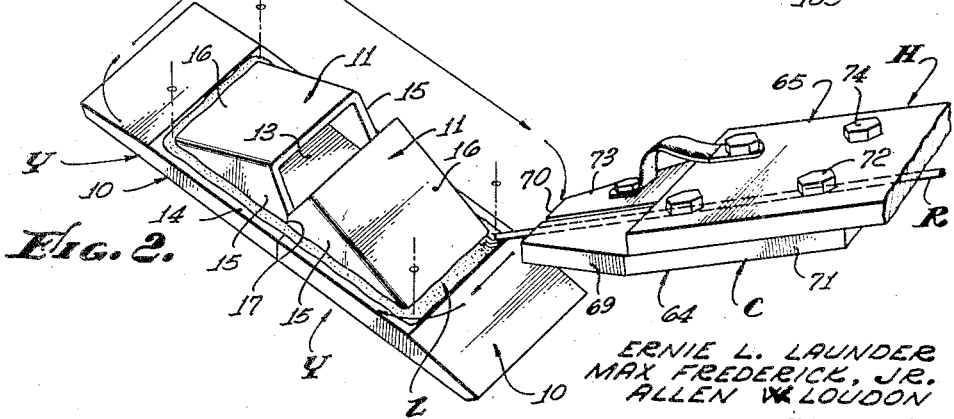
Figure 12:
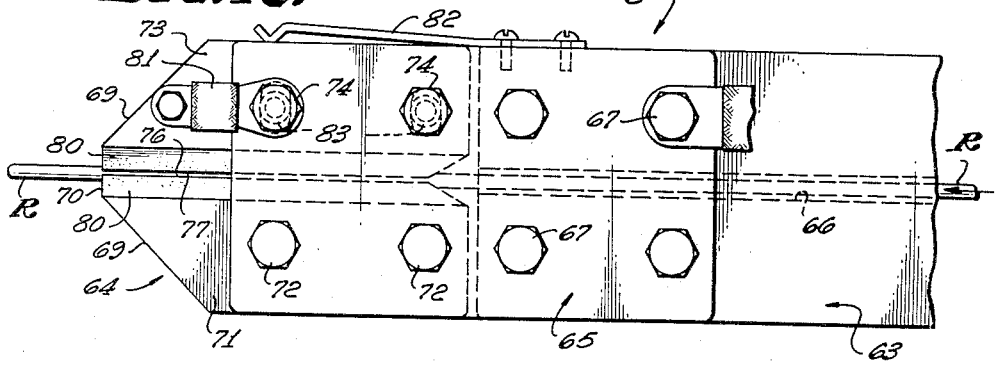
Figure 13:
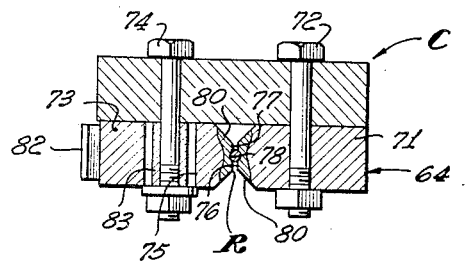
Figure 13A:
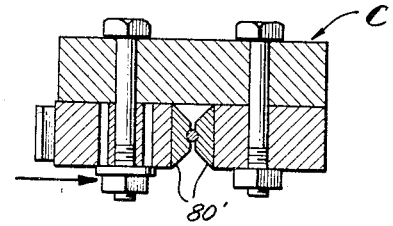
Figure 14:
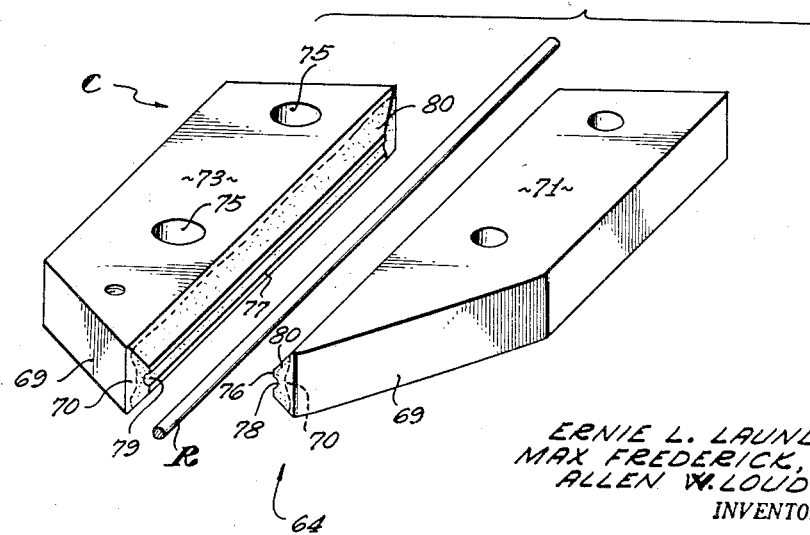

The various objects and features of the invention will be fully understood from the following detailed description of typical preferred forms and applications of the invention, throughout which description reference is made to the accompanying drawings, in which:

Fig. 1 is a front elevation of a machine employing the welding head of the present invention, and showing a piece of work in the machine being acted upon by the head. Fig. 2 is an enlarged perspective view showing a typical piece of work being acted upon by the head, as shown in Fig. 1. Fig. 3 is an enlarged detailed sectional view taken substantially as indicated by line 3—3 on Fig. 1, part of the structure being rotated in order to show in side elevation. Figs. 4 and 5 are transverse sectional views taken as indicated by lines 4—4 and 5—5 on Fig. 3. Fig. 6 is a sectional view taken as indicated by line 6—6 on Fig. 3. Fig. 7 is an enlarged sectional view taken as indicated by line 7—7 on Fig. 3. Fig. 8 is an enlarged perspective view of a portion of the structure shown in Figs. 1 and 3. Figs. 9 and 10 are sectional views taken as indicated by lines 9—9 and 10—10 on Fig. 8. Fig. 11 is a sectional view taken as indicated by line 11—11 on Fig. 10. Fig. 12 is a view taken as indicated by line 12—12 on Fig. 10. Fig. 13 is a sectional view taken as indicated by line 13—13 on Fig. 10. Fig. 13a is a view similar to Fig. 13 and showing a modified form of construction, and Fig. 14 is an exploded perspective view illustrating the relationship of parts that guide the welding rod handled by the head.

The present invention provides a welding head for a machine X that can be used to advantage to assemble or fabricate various parts of work and, since it is particularly practical as applied to the fabrication of digger teeth Y, it is shown in a form designed for that purpose, and in the drawings, digger teeth of typical form are set forth. For example, in Figs. 1 and 2 there is illustrated a digger tooth cap construction Y characterized by a flat heavy blade 10 and a cup-like sheet metal body 11 which is applied to one side of the blade to establish a tapered or converging cup-shaped opening 13 adapted to receive a tooth shank. The cap construction, as shown in the drawings, involves the light sheet metal body 11 having sides 15 and an end 16 that engage the back side 14 of the blade, and the machine of the present invention is provided to apply welding Z to join the sides 15 and 16 of the body 11 to the blade 10.

To facilitate rapid production it is preferred that the machine of the present invention be employed to handle two caps Y simultaneously, in which case the blades 10 of these two caps are arranged end to end, so that the blades are oppositely disposed. The bodies 11 of the two caps are arranged on the blades, and in the case illustrated, the abutting ends of the blades 10 are flat at 17. With the cap parts just referred to arranged, as shown in Fig. 2, a single continuous line of welding Z may be applied in rectangular form to extend around the two related caps, effectively joining the bodies of the caps to the blades, and when the welding has been completed the two caps are parted by severing or breaking the welding that occurs where the caps adjoin.

The machine as set forth in Fig. 1 includes primarily a frame 18 characterized by a rigid horizontally disposed elongate base 19 carried by suitable supporting structure, standards 20 projecting upward from the base and supporting a horizontal top beam or header 21 and having rails 22 extending longitudinally thereof.

A work carrier 23 is provided on the base 19 and is characterized by an elongate table which is a simple flat horizontally disposed plate like part that is shiftable. A fixture 24 is provided on the carrier 23 to position the parts to be welded and when the carrier is elongate and extends to the forward end portion of the machine the fixture is preferably fixed on or located at the forward end portion of the carrier. The fixture as provided serves to hold the work and also the flux employed as the welding operation is carried out. A suitable mounting means (not shown) is provided for supporting the carrier 23 on or from the base 19 of frame 18 for free movement or reciprocation of the table lengthwise, and a suitable operating means (not shown) is provided to reciprocate or operate the carrier 23 relative to the base of the frame. A stop means (not shown) is also provided to limit or determine the travel or movement of the carrier 23 relative to the base 19.

A welding head H is provided to carry a welding rod or wire R and a mounting means for the welding head H includes a vertically disposed spindle 25, a carriage 26 supporting the spindle for rotation about a vertical axis, means 27 mounting the carriage on the rails 22 of frame 18, and a head 28 carried by the spindle. The head 28 carries the welding head H and has a central opening therein adapted to pass a supply of flux from a duct 29 extending vertically through the spindle and to a delivery tube 30. An operating means (not shown) is provided for actuating the carriage 26 so that it is reciprocated transversely above the forward end portion of carrier 23, and a drive means, later described, is provided for turning the spindle. A stop means (not shown) is provided to limit the travel of the carriage 26.

The base 19 of frame 18 is an elongate horizontally disposed rectangular unit. The standards 20 of the frame are located at the forward end portion of the base 19 and are spaced apart transversely of the machine, as clearly illustrated in Fig. 1 of the drawings. The standards 20 are like tubular members that carry the header 21 so that it extends horizontally across the machine above the forward end portion of the base 19 and the carrier 23. The rails 22 are carried by the header 21 through suitable brackets and they extend longitudinally of the beam and are horizontally disposed, as clearly illustrated. The work carrier 23 is provided to support one or more units of work as by means of the fixture 24, and in its preferred form it is a part of the machine which reciprocates lengthwise of the base, beneath the header 21 of the frame 18. The carrier is located at the top of the base, preferably immediately above the top surface thereof.

The spindle 25 is provided to carry the welding head H and serves to support the head so that the tip thereof delivers the welding rod R at a particular point or in a particular location relative to the carrier 23 and more specifically, relative to the fixture 24, and it supports the head so that it faces downwardly and inwardly toward that point, and so that the head as a whole is rotatable about a vertical axis intersecting at that point and can be moved as desired through a complete circle, that is, through 360°, as circumstances require.

The spindle 25 is an elongate vertically disposed element supported by carriage 26 to depend therefrom, and is tubular, being provided with a central tubular passage that extends continuously through the spindle from one end to the other and is employed for the handling of flux to be delivered to the flux delivery duct 30 (see Fig. 1). The spindle 25 is supported by carriage 26 through suitable anti-friction bearings 33, there being upper bearings in the main or body portion of the carriage, and a lower bearing at the lower end of an extension 34 of the carriage, which extension depends a substantial distance below the body 35 of the carriage. In the preferred construction a suitable brake or drag member 36 is carried by the extension and engages the spindle to maintain a certain amount of friction on the spindle so that it does not turn unless deliberately operated.

A drive means M is provided by the present invention to turn the spindle 25 and thereby operate it through a predetermined cycle of movement relative to the carriage 26. The drive means M includes a round flange 37 fixed on the spindle above the body portion 35 of carriage 26, and at a point where it is within the header 21 of frame 18. A plurality of circumferentially spaced pins 38 are carried by the flange 37 and are shown as projecting upwardly therefrom, and each pin is preferably in the nature of a roller, as shown in the drawings. A pusher 39 is operated by a suitable means 40 to move relative to the spindle, and is adapted to engage and push the pins 38 and thereby effect the desired rotation or turning of the spindle.

In the mechanism provided, the pusher 39 includes a block or head 41 carried on a reciprocating rod 42, and it includes a bell crank mounted on the head 41 by means of a pivot pin 43. The bell crank has a pusher arm 44 and a stop arm 45. The pusher arm 44 of the bell crank is carried so that its outer or terminal end moves or reciprocates tangentially of the spindle when the rod 42 is reciprocated, and it is related to the pins 38, so that, as the rod 42 moves out, or in the direction indicated by the arrow in Fig. 7, the terminal end of arm 44 engages a pin 38 and pushes it in the direction indicated with resulting turning of the spindle.

When the rod 42 is returned or retracted the arm 44 of the bell crank is retracted or moved back and will drag and lift over the next pin 38 in its path, in the course of which action the bell crank pivots about the pin 43, as will be apparent from a consideration of Fig. 7 of the drawings. When the rod 42 and therefore the arm 44 of the bell crank reaches a completely returned or retracted position, the bell crank returns to a normal position where the terminal end of arm 44 is directly opposite a pin 38, namely, the pin over which the arm has just dragged or rocked, so that the next movement or advance of the rod 42 effects turning of the spindle.

The stop arm 45 serves as a means by which the action of the pusher arm 44 of the general relationship of the parts is suitably set and limited. A spring 46 is connected to the stop arm 45 and normally tends to move the bell crank to a position where the pusher arm 44 is positioned to engage and operate a pin 38. A stop member or set screw 47 is adjustable to accurately set or determine positioning of the bell crank.

The means or mechanism provided for operating the rod 42 is preferably a fluid pressure actuated mechanism and is shown as including a cylinder 48 fixed to or carried by the carriage 26 and the rod 42 is the piston rod of this cylinder and piston mechanism, as will be apparent from a consideration of Fig. 7 of the drawings.

In the particular form of the invention under consideration, that is, where the machine is handling the particular work that has been described, it is preferred that the spindle 25 be turned through exactly 90° each time it is operated by the drive means M. In this case, the mechanism of means M as above described is established with four equally spaced pins 38 on the flange 37, and the mechanism is operated and set so that each time the fluid pressure actuated mechanism of means M operates, it effects an advance or turning of the spindle 25 through exactly 90°. An adjustable stop 47' is carried by the arm 45 to limit rotation of the flange 37.

In carrying out the invention, the electric circuit incidental to the welding operation is completed through the carrier 23 and through the fixture 24 and for this purpose a conductor 31 handling the welding circuit can be connected to the carrier and/or to the fixture of the machine and is grounded, say for instance, to the base 19. The welding circuit included in the machine may, in a typical situation, involve a D. C. circuit energized by a motor generator set or the like, and in the particular machine under consideration the welding head H is carried on an insulated mounting on the spindle 25. The welding head H is energized by a line 49 carrying one side of the welding circuit. The other side of the welding circuit may, in effect, be grounded and involves the line 31 above referred to. The energizing circuit from the generator set extends from the generator to a commutator mechanism 50 at the spindle where it connects with a brush 51 of the mechanism 50 which is supported by a suitable insulator 52. The brush 51 contacts a ring type contact 53 mounted on the spindle by means of insulation 54, and the line 49 continues from the ring contact 53 to the welding head H, as shown.

The welding head H is provided to handle the welding wire or rod R and in turn is carried by the head 28 which in turn is carried by the spindle 25. In practice, the welding head H may vary in form and construction, depending upon the welding material being handled, the particular work to be acted upon, and various other factors. The particular welding head H illustrated throughout the drawings involves, generally, a drive or rod feeding means A, a mounting means B supported by the spindle 25 and carrying the rod feeding means A, a rod guiding means C carried by and adapted to receive rod fed by the means A, an adjusting means D adapted to position the guiding means C, a rod supply means E for delivering rod R to the feeding means A, and a rod straightening means F, preferably between the means E and means A.

The drive or rod feeding means A is supported by the spindle 25, preferably at or by the lower end portion thereof, and it in turn carries the rod guiding means C, and preferably carries the other elements of the head H, including the means E and F. In the particular construction under consideration, the means A is characterized by a case 55 adapted to enclose the mechanism thereof. The rod feeding means A, which may be any suitable mechanism of this type, is carried by case 55 and, in the preferred construction, the means A includes a suitable mechanism within the case 55 engaging the rod R that passes through the case. In practice, any suitable rod or wire feeding mechanism can be employed in carrying out the present invention, and for this reason, this portion of the mechanism is indicated generally. As shown, there is a prime mover or motor 56 mounted on the exterior of the case 55, that rotates a drive wheel 57 within the case. The drive wheel 57 engages with the rod R and when rotated it moves or propels the rod through the case and delivers it to the rod guiding means C, later described.

The rod feeding means A carried in case 55 of the welding head H is operated, causing the welding rod R to be fed to the work at the desired rate. The driving or energizing circuit to the motor 56 operating the feeding means A is communicated to the motor through a commutator type mechanism occurring at the spindle 25 which mechanism includes annular contacts 100 on the spindle within the extension 34 of carriage 26, and brush contacts 101 suitably insulated and carried by the extension 34 to engage and cooperate with contacts 100. In practice, it is preferred that the motor 56 be of the type commonly employed in connection with a welding rod feed such as is shown in the drawings, to the end that the feed of welding rod is properly coordinated with the welding action, and in such case the commutator mechanism includes a plurality of related contacts carrying the desired circuits to the necessary parts of motor 56, such as the field as well as the armature thereof.

The mounting means B that is provided in accordance with the invention is adapted to adjustably position the welding head H angularly relative to the vertical rotative axis of the spindle 25. As clearly illustrated in Figs. 1 and 3 of the drawings, the welding rod R is fed through the case 55 and through the rod guiding means C on an axis intersecting the vertically disposed axis of the spindle 25, to the end that a point of weld is established at the central axis of the spindle regardless of the rotative position thereof. It is to be observed that the angular relationship of the rod R and spindle axis may be varied without displacing the point of weld. In the form of the invention illustrated the head 28 supports the case 55 through an arcuate arm 59 provided with a slot 60. The head 28 is carried at the lower terminal end of the spindle 25, and a retainer or nut 58 on the spindle is provided beneath the block to hold it, as clearly illustrated in the drawings. A bracket 61 is carried by the lower end portion of the spindle 25 and overlies the end portion of the carriage extension 34 and supports the drag member 36 so that it engages the spindle, as above described. The arcuate arm 59 and slot 60 are curved about a center substantially coincidental with the normal point of weld where the axes of the spindle 25 and welding rod R normally intersect, and the arm is horizontally disposed to lie adjacent one side of the head 28, as shown. Suitable clamp screws 62 are threaded into the head 28 and engage the slotted arm so that the arm is movable transversely through an arc intersecting the normal point of weld.

Because of the manner in which the welding circuit is handled in or by the machine, the head 28 of welding head H is electrically insulated from the spindle 25 as by suitable insulation 62 provided where the spindle and arm are related as shown in Fig. 6 of the drawings. The case 55 of the feeding means A is supported by the head 28 so that it is laterally offset from the spindle 25 and depends from the block as clearly illustrated in Fig. 1 of the drawings. From the construction described, it will be apparent that the welding head H is supported from spindle 25 so that it can be suitably adjusted angularly to vary the angle to which the welding rod R is related to the point of weld.

The rod guiding means C that is provided in accordance with the invention is adapted to receive welding rod R as it is fed from the feeding means A and to deliver it to the point of weld. The means C involves, generally, a guide arm 63, a guide tip 64, and a coupler 65 that secures the tip 64 to the arm 63. The guide arm 63 is elongate in form and projects downward and forward from the case 55 to carry the guide tip 64. The guide arm is a flat plate-like part having a passage 66 extending longitudinally therethrough to freely pass the welding rod R. The top of the arm 63 is flat and the lower terminal end thereof is preferably flat and normal to the axis thereof. The coupler 65 is a flat plate-like part that overlies the lower end portion of the guide arm 63, preferably the flat top thereof. The coupler 65 has flat engagement with the top of the arm and is secured thereto so that it projects from the lower terminal end of the arm to receive and carry the guide tip 64. The coupler is preferably secured to the arm by a plurality of screw fasteners 67 one of which may be employed to hold the terminal end of the line 49 involved in the welding circuit.

The guide tip 64 establishes a passage continuing from the passage 66 in arm 63 to pass the rod R. The tip 64 has a converging forward end faces 69 at which the passage continuation terminates, so that the welding rod R issues from the lower terminal end 70 of the tip in the manner clearly illustrated in Figs. 1 and 2 of the drawings.

In the construction illustrated, the guide tip 64 is made up of a block 71 fixed to the coupler 65 by fasteners 72, and of a block 73 adjustably secured to the coupler 65 by fasteners 74. The block 71 is fixedly secured in working position while the block 73 is shiftable and has transverse slots 75 passing the fasteners 74 so that the block 73 can be adjusted laterally relative to block 71 and thus establish a continuation of the passage 66 so that it has the desired relation to the rod R.

In accordance with the invention the blocks 71 and 73 have opposed inner faces 76 and 77, respectively, that are normally parallel with each other. Welding rod R is ordinarily round in cross section and, therefore, each face, 76 and 77 is provided with an arcuate rod guiding channel there being a channel 78 in the block 71 and a channel 79 in the block 73. The said channels are straight and parallel with each other and are arcuate in cross section to have flat sliding engagement with the rod R. Hard facing material (see Fig. 13), or liners 80' (see Fig. 13a) of hard or wear taking material are provided at the opposed faces of the blocks 71 and 73 so that there is not excessive wear of the blocks incidental to the passing of the rod R therethrough. When a liner 80' is employed it may be made of "Carboloy" or the like, and may be secured in place or by brazing. When the conductor 49 of the welding circuit terminates at the coupler 65, as above described, it is preferred to provide a direct electrical connection 81 between the coupler and the guide tip, for instance, between coupler 65 and block 73 of the tip, as clearly shown.

In the preferred construction, the rod guiding means C includes means whereby the block 73 is normally yieldingly urged toward the opposed block 71 so that there is maintained an effective electrical contact between the blocks and the welding rod R. In the case illustrated, a leaf spring 82 is carried by the arm 63 of the guide means C and it engages the block 73 to normally yieldingly bear against it laterally and to urge it inwardly as indicated by the arrow in Fig. 13. The fasteners 74 are engaged with sleeves 83 that guide the block 73 to allow for the said desired movement or shifting of block 73 relative to block 71 and under the action of spring 82, whereby the block 73 is maintained in sliding pressure engagement with the rod R which in turn is maintained in sliding pressure engagement with block 71. In practice, the converging faces 69 form a pointed tip so that the tip can be placed relatively close to the point of weld, with the result that a maximum current can pass through the rod without overheating it.

The adjusting means D is provided in accordance with the invention to accurately position the terminal end of the welding rod R so that it occurs at the exact point of weld when the welding operation is in process. It will be seen that the assemblies of different parts of work will require different positioning of the rod guiding means C. That is, when the thickness of a part corresponding to the blade 10 of the digger tooth cap, above described, is changed, it becomes necessary to raise or lower the guiding means C relative to the work. The adjusting means D involves, generally, a base plate 85, a horizontal pivot 86, and a vertical pivot 87. The means D involves said horizontal and vertical pivots whereby the guide arm 63 is articulate and can be positioned as desired. As shown, the base plate 85 is secured to the lower side of the case 55 and is a flat element with a central opening 88 therein that freely passes the welding rod R. Further, the plate 85 is in the nature of a saddle and is provided with an elongate seat 89 that extends transverse of the plate intersecting the opening 88 and the axis of the rod R. The said seat 89 is preferably horizontally disposed.

The pivot members 86 and 87 are shiftable about axes normal to each other so that the guide arm 63 is universally shiftable. As shown, the pivots are plate-like parts, the pivot 86 being pivoted on the base plate 85 and the pivot 87 being pivoted on the pivot 86. The two pivots each have a central opening therein to freely pass the rod R. As shown in Fig. 10, the pivot 86 has a boss 90 projecting from the top thereof and extending transverse and horizontally thereof, and engaged in the seat 89 to have pivotal engagement therewith. A seat 91 is provided in the bottom of the pivot 86 and extends transverse of the said pivot intersecting the opening therein and the axis of the rod R and normal to the boss 90. As shown in Fig. 9, the pivot 87 has a boss 92 projecting from the top thereof and extending transversely thereof, and in a vertical plane in the seat 91 to have pivotal engagement therewith. The arm 63 is secured to and projects from the the bottom side of the pivot 87.

In order to provide adjustment and to secure the guide arm 63 in a selected fixed position, a pair of adjusting screws is provided in connection with each pivot member 86 and 87. As shown, the pivots 86 and 87 are of substantial width and are provided with openings at either side of the bosses. A pair of spaced adjustment bolts 95 project from the base plate 85 and pass through openings in the pivot 86 and have heads engaged with the pivot to position it. A pair of spaced adjustment bolts 96 project from the pivot 86 and pass through openings in the pivot 87 and have heads engaged with the pivot to position it. The said pair of adjustment bolts are positioned diametrically opposite each other, as shown.

It will be apparent that suitable adjustment of the bolts 95 and 96 will result in the desired positioning of the guide arm 63.

The rod supply means E is provided to handle a suitable supply of welding material, that is, a suitable supply of wire or welding rod R. In the particular construction illustrated, the means E includes an upwardly projecting yoke-like bracket 97 on the case 55. The bracket 97 carries a pivot 98 supporting a reel 99 carrying a suitable supply of wire or rod R. The rod R from the reel 99 extends down from the reel to and through the case 55 to be received by the rod guiding means C. It is a simple matter to apply a reel 99 of welding rod R to the pivot 98 and to direct said rod through the case 55 to be fed by the feeding means A to the rod guiding means C.

The rod straightening means F is provided to straighten the rod as it issues from the coil on reel 99 to the feeding means handling it, and as it passes to the point where it is used. Any suitable straightening means may be employed and may include rollers or guides that operate on the rod R as it issues from the reel 99 to straighten it before it passes through the case 55.

In accordance with the general arrangement and proportioning of parts, the extension 34 of the carriage 26 depends a substantial distance below the header 21 so that the reel 97 carried by welding head H is supported in a position laterally offset from the extension 34 and in a vertical position so that it will clear or pass with clearance beneath the header 21 as the spindle 25 is rotated through a complete circle. The general relationship of parts just referred to is clearly illustrated in Fig. 1 of the drawings.

In the particular machine illustrated there are various manually operable controls at 105 which, in practice, are made accessible to the operator of the machine and which, considered generally, are to be used in the setting or adjusting of the machine or to control the machine in the event of emergency, as circumstances may require. A control for operation of the machine is set forth in detail in the above mentioned patent.

From the foregoing description it will be understood that the action of the machine may be fully automatic or under control of an operator. The control of the machine has been mentioned in general only and without specific reference to the details of the particular controls that may be employed. The welding head H is extremely versatile and may be adjusted and operated to weld a wide variety of parts and assemblies of parts. The tip or terminal end of the welding rod R is always red to the point of weld which is at the central axis of the spindle 25, and when the thickness of parts to be welded is changed, or when the height thereof varies, the universally articulated rod guiding arm 63 is easily adjusted and set to direct the rod R to the exact point of weld. Further, the blocks 71 and 73 of the rod guiding tip are such as to hold the welding rod R in the exact desired position without deviation with the result that a uniform and highly satisfactory weld X is established, and formed continuously around the work involved.

Having described only the typical preferred forms of the invention, we do not wish to be limited or restricted to the specific details herein set forth, but wish to reserve to ourselves any variations or modifications that may appear to those skilled in the art and fall within the scope of the following claims.

Having described our invention, we claim:

1. A head for a welding machine of the character described and adapted to apply a weld to the periphery of rectangular assemblies of parts and the like, including, a rod feeding means, mounting means carrying the feeding means laterally offset from a vertically disposed axis of rotation, and a rod guiding means carried by the feeding means and depending therefrom on an axis angularly related to and intersecting the axis of rotation of said mounting means at the point of weld.

2. A head for a welding machine of the character described and adapted to apply a weld to the periphery of rectangular assemblies of parts and the like, including, a rod feeding means, mounting means carrying the feeding means laterally offset from a vertically disposed axis of rotation, a rod guiding means carried by the feeding means and depending therefrom on an axis angularly related to and intersecting the axis of rotation of said mounting means at the point of weld, and an adjusting means adapted to selectively position the guiding means relative to said vertical axis of rotation.

3. A head for a welding machine of the character described and adapted to apply a weld to the periphery of rectangular assemblies of parts and the like, including, a rod feeding means having a case and handling welding rod so that it issues from said case, mounting means carrying the case laterally offset from a vertically disposed axis of rotation, and a rod guiding means carried by the case and having an arm depending from the case on an axis angularly related to the axis of rotation and directing the rod along said angularly related axis intersecting the axis of rotation of said mounting means at the point of weld.

4. A head for a welding machine of the character described and adapted to apply a weld to the periphery of rectangular assemblies of parts and the like, including, a rod feeding means having a case and handling welding rod so that it issues from said case, mounting means carrying the case laterally offset from a vertically disposed axis of rotation, and a rod guiding means carried by the case and having an arm depending from the case on an axis angularly related to the axis of rotation and with a tip slidably directing the rod along said angularly related axis intersecting the axis of rotation of said mounting means at the point of weld.

5. A head for a welding machine of the character described and adapted to apply a weld to assemblies of parts and including, a rod feeding means, and a rod guiding means carried by the feeding means and having an arm projecting therefrom and with a tip having a pair of elongate blocks with opposed liners directing the rod along an axis intersecting the axis of rotation of said mounting means, said liners being of hard facing material.

6. A head for a welding machine of the character described and adapted to apply a weld to assemblies of parts and including, a rod feeding means, and a rod guiding means carried by the feeding means and having an arm projecting therefrom and with a tip having a pair of elongate blocks with opposed liners of hard facing material directing the rod along an axis intersecting the axis of rotation of said mounting means, said blocks being biased one against the other.

7. A head for a welding machine of the character described and adapted to apply a weld to the periphery of rectangular assemblies of parts and the like, including, a rod feeding means having a case and handling welding rod so that it issues from said case, mounting means carrying the case laterally offset from a vertically disposed axis of rotation, a rod guiding means carried by the case and having an arm depending from the case on an axis angularly related to the axis of rotation and directing the rod along said angularly related axis intersecting the axis of rotation of said mounting means at the point of weld and an adjusting means adapted to position the arm to selectively locate the axis of the rod relative to said axis of rotation.

8. A head for a welding machine of the character described and adapted to apply a weld to the periphery of rectangular assemblies of parts and the like, including, a rod feeding means, mounting means rotatably carrying the feeding means, a rod guiding means carried by the feeding means and depending therefrom on an axis angularly related to and intersecting the axis of rotation of said mounting means, and an adjusting means adapted to position the guiding means relative to the axis of rotation and including a pivoted connection between the feeding means and the guiding means.

9. A head for a welding machine of the character described and adapted to apply a weld to the periphery of rectangular assemblies of parts and the like, including, a rod feeding means, mounting means rotatably carrying the feeding means, a rod guiding means carried by the feeding means and depending therefrom on an axis angularly related to and intersecting the axis of rotation of said mounting means, and an adjusting means adapted to position the guiding means relative to the axis of rotation and including a pair of pivots universally connecting the guiding means to the feeding means.

10. A head for a welding machine of the character described and adapted to apply a weld to the periphery of rectangular assemblies of parts and the like, including, a rod feeding means having a case and handling welding rod so that it issues from said case, mounting means carrying the case laterally offset from a vertically disposed axis of rotation, a rod guiding means carried by the case and having an arm depending from the case and angularly related to and directing the rod along an axis intersecting the axis of rotation of said mounting means, and an adjusting means adapted to position the arm to locate the axis of the rod relative to the said axis of rotation and including a pivoted connection between the arm and the said case.

11. A head for a welding machine of the character described and adapted to apply a weld to the periphery of rectangular assemblies of parts and the like, including, a rod feeding means having a case and handling welding rod so that it issues from said case, mounting means carrying the case laterally offset from a vertically disposed axis of rotation, a rod guiding means carried by the case and having an arm depending from the case and angularly related to and directing the rod along an axis intersecting the axis of rotation of said mounting means, and an adjusting means adapted to position the arm to locate the axis of the rod relative to the said axis of rotation and including a pair of pivots universally connecting the arm to the said case.

12. A head for a welding machine of the character described and adapted to apply a weld to the periphery of rectangular assemblies of parts and the like, including, a rod feeding means having a case and handling welding rod so that it issues from said case, mounting means carrying the case laterally offset from a vertically disposed axis of rotation, and a rod guiding means carried by the case and having an arm depending from the case and with an opening therethrough passing the rod, the arm being angularly related to and directing the rod along an axis intersecting the axis of rotation of said mounting means.

13. A head for a welding machine of the character described and adapted to apply a weld to the periphery of rectangular assemblies of parts and the like, including, a rod feeding means having a case and handling welding rod so that it issues from said case, mounting means carrying the case laterally offset from a vertically disposed axis of rotation, a rod guiding means carried by the case and having an arm depending from the case and with an opening therethrough passing the rod, the arm being angularly related to and directing the rod along an axis intersecting the axis of rotation of said mounting means, and an adjusting means adapted to position the arm to locate the axis of the rod relative to said axis of rotation.

14. A head for a welding machine of the character described and adapted to apply a weld to the periphery of rectangular assemblies of parts and the like, including, a rod feeding means having a case and handling welding rod so that it issues from said case, mounting means carrying the case laterally offset from a vertically disposed axis of rotation, a rod guiding means carried by the case and having an arm depending from the case and with an opening therethrough passing the rod, the arm being angularly related to and with a tip directing the rod along an axis intersecting the axis of rotation of said mounting means, and an adjusting means adapted to position the guiding means relative to the axis of rotation and including a pivotal connection between the feeding means and the guiding means.

15. A head for a welding machine of the character described and adapted to apply a weld to the periphery of rectangular assemblies of parts and the like, including, a rod feeding means having a case and handling welding rod so that it issues from said case, mounting means carrying the case laterally offset from a vertically disposed axis of rotation, a rod guiding means carried by the case and having an arm depending from the case and with an opening therethrough passing the rod, the arm being angularly related to and with a tip involving a pair of blocks with opposed channels directing the rod along an axis intersecting the axis of rotation of said mounting means, and an adjusting means adapted to position the guiding means relative to the axis of rotation and including a pair of pivots universally connecting the guiding means to the feeding means.

References Cited in the file of this patent

UNITED STATES PATENTS

| | | |
|---|---|---|
| 1,508,713 | Noble | Sept. 16, 1924 |
| 1,732,900 | Kuhl et al. | Oct. 22, 1929 |
| 2,189,399 | Lewbers | Dec. 12, 1940 |
| 2,364,826 | Smith | Dec. 10, 1944 |

FOREIGN PATENTS

| | | |
|---|---|---|
| 11,512 | Austria | Dec. 10, 1928 |